(12) United States Patent
Lindoff et al.

(10) Patent No.: US 8,320,359 B2
(45) Date of Patent: Nov. 27, 2012

(54) SYNCHRONIZATION CHANNEL SCHEME FOR SUPER 3G

(75) Inventors: Bengt Lindoff, Bjärred (SE); Robert Baldemair, Hägersten (SE); Kambiz Zangi, Chapel Hill, NC (US); Stefan Parkvall, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1734 days.

(21) Appl. No.: 11/531,219

(22) Filed: Sep. 12, 2006

(65) Prior Publication Data

US 2007/0093253 A1  Apr. 26, 2007

Related U.S. Application Data

(60) Provisional application No. 60/725,370, filed on Oct. 11, 2005.

(51) Int. Cl.
*H04J 3/06* (2006.01)
(52) U.S. Cl. ......................... 370/350; 455/450
(58) Field of Classification Search .................. 370/203, 370/350
See application file for complete search history.

(56) References Cited

U.S. PATENT DOCUMENTS

| 7,289,483 B1 * | 10/2007 | Lim ............................... 370/342 |
| 7,386,055 B2 | 6/2008 | Morita et al. |
| 2004/0085946 A1 | 5/2004 | Morita et al. |
| 2009/0185550 A1 * | 7/2009 | Naka et al. .................... 370/350 |
| 2009/0213833 A1 * | 8/2009 | Cai et al. ........................ 370/350 |

OTHER PUBLICATIONS

Hlaing Minn; et al., "A Robust Timing and Frequency Synchronization for OFDM Systems," IEEE Transactions of Wireless Communications, vol. 2, No. 4, Jul. 2003, pp. 822-839.

* cited by examiner

*Primary Examiner* — Kevin C Harper
*Assistant Examiner* — Henry Baron

(57) ABSTRACT

An apparatus and method operable to enable the use of synchronization (SCH) and broadcast channel (BCH) signals with a bandwidth (BW) equal to the minimum possible BW for the system, for example 1.25 MHz. The present invention increases the speed of the initial cell search. In addition, the repetition of signals in the frequency domain makes it possible to perform a faster cell detection in the event a system/mobile terminal/UE is using a larger BW. When the present invention is used in a high BW system, a mobile terminal/UE is operable to determine whether to perform a cell search on a low or high BW to get sufficient cell detection performance.

26 Claims, 3 Drawing Sheets

SYNCHRONIZATION CHANNEL SCHEME FOR SUPER 3G

CROSS-REFERENCE TO RELATED APPLICATIONS

This application claims the benefit of U.S. Provisional Application No. 60/725,370, filed Oct. 11, 2005, the disclosure of which is incorporated herein by reference.

BACKGROUND

In the evolution of the mobile cellular standards such as Global System for Mobile Communication (GSM) and Wideband Code Division Multiple Access (WCDMA) new modulation techniques like Orthogonal Frequency Division Multiplexing (OFDM) are likely to be implemented. Introducing cyclic prefix in OFDM makes it robust to delay spread and facilitates very high data rates. OFDM can be regarded as a combination of modulation and multiple-access schemes that segments a communications channel in such a way that many users can share it. Whereas TDMA segments are according to time and CDMA segments are according to spreading codes, OFDM segments are according to frequency. It is a technique that divides the spectrum into a number of equally spaced tones. OFDM then carries a portion of a user's information on each tone. A tone can be thought of as a unique frequency in which each tone is orthogonal with every other tone. FDM typically requires there to be frequency guard bands between the frequencies so that they do not interfere with each other. OFDM allows the spectrum of each tone to overlap, and because they are orthogonal, they do not interfere with each other. By allowing the tones to overlap, the overall amount of spectrum required is reduced. In OFDM, information is modulated onto a tone by adjusting the tone's phase, amplitude, or both. An OFDM system takes a data stream and splits it into N parallel data streams, each at a rate 1/N of the original rate. Each stream is then mapped to a tone at a unique frequency and combined together using the Inverse Fast Fourier Transform (IFFT) to yield the time-domain waveform to be transmitted.

In order to smoothly migrate the existing cellular systems to the new high capacity high data rate system in existing radio spectrum, a new system has to be able to operate on a flexible BW. A proposal for such a new flexible cellular system is Super 3G (S3G), also known as long term evolution of the 3GPP (3GPP LTE), that can be seen as an evolution of the 3G WCDMA standard. S3G will likely use OFDM and will be able to operate on bandwidths (BWs) spanning from 1.25 MHz to 20 MHz. Furthermore, S3G should also be able to work in micro cells, having a radius of about 10 meters, as well as macro cells, having a radius of about 10-100 kilometers. Data rates of up to 100 Mb/s will be possible in the high bandwidth (BW), micro cell system case. In order to achieve those rates, it is anticipated that a different cyclic prefix scheme would be implemented in S3G. There would be one long cyclic prefix used for macro cells with a large delay spread, thereby increasing the overhead and reducing the maximum data rate, and one short cyclic prefix used in small cells, with small multi-path components, thereby decreasing the overhead and increasing the maximum data rate.

The flexibility of the S3G system will introduce new challenges to mobile terminal/user equipment (UE) design. For instance, the variable BW and different cyclic prefix will impose new requirements on synchronization channels for cell search and mobility procedures. In existing cellular systems, such as WCDMA and GSM, a fixed BW is used. A cell search procedure in such system operates as following:

1. For each carrier frequency, receive and down-convert the signal to a baseband signal with BW (equal to the BW of the cellular system (200 kHZ GSM/5 MHz WCDMA) and perform cell search by searching for the cellular system's particular synchronization channels (GSM: FCH, SCH bursts; and WCDMA: P-SCH, S-SCH channels);

2. If a cell is found, correct the carrier frequency (if initial cell search and the mobile terminal/UE local oscillator is not locked to the cellular systems); and 3. Detect the ID of the cell and read the broadcast channel (BCH) and, if the mobile terminal/UE is allowed, camp on the cell (in idle mode) or include the cell in the neighboring set (if active mode).

The search time for the first stage above can be reduced by using a history list (initial cell search) or neighbor list (cell search in active/idle mode) in order to provide a priori knowledge about the used carrier frequencies. The foregoing process is discussed in U.S. patent application Ser. No. 10/315,710, co-owned by Assignee of the Applicant. A conventional synchronization (cell search) procedure for an OFDM system (like WLAN) having fixed Bandwidth and fixed cyclic prefix length is as follows:

1. For each carrier frequency, receive and down-convert the signal to a baseband signal with BW corresponding to the OFDM system BW and slot timing (i.e. SCH channel);

2. Perform coarse frequency correction;

3. Perform fine frequency synchronization (e.g. using the knowledge of the cyclic prefix length);

4. Detect the Cell ID and Read broadcast; and

5. Camp on the cell.

An in-depth discussion of the cell search procedure for a fixed BW OFDM system can be found at Minn, et al., "A Robust Timing and Frequency Synchronization for OFDM Systems", IEEE Transactions on Communications, Vol. 2 No 4, July 2003 ("Minn"). These conventional cell search solutions can not directly be applied to S3G as S3G has a variable BW and cyclic prefix. What is desired, then, is a fast and accurate cell search procedure for cellular OFDM systems having variable BW.

SUMMARY

The method and apparatus of the present invention enables the use of SCH and BCH signals (SCH and/or BCH) signals in a cellular telecommunications system, using a BW equal to the minimum possible BW for the system, for example 1.25 MHz. For purposes of this disclosure, the BWs used by SCH and BCH are collectively and individually referred to as a $BW_B$. The SCH AND/OR BCH signals are then repeated for at least some parts of the entire system BW. The repetition could be performed in the same OFDM symbol or in a staggered fashion. The 1.25 MHz BW SCH signals could be identical, including both cell group and cell ID information, or some of the SCH signals may represent cell groups and some may represent cell IDs. Furthermore, using a 1.25 MHz BW SCH AND/OR BCH signal, the UE only has to search for a specific 1.25 MHz SCH signal and then read the 1.25 MHz BCH containing necessary information so as to camp/connect to the cell, regardless of the system BW. This process increases the speed of the initial cell search. In addition, the repetition makes it possible to perform a faster cell detection in the event the system/UE is using a larger BW. When the present invention is used in a high BW system, the UE is operable to determine whether to perform cell search on a low or high BW to get sufficient cell detection performance. For example, if a high speed, fast cell detection is required, then multiple SCH correlations are needed. The present invention enables an efficient cell search procedure in the UE.

BRIEF DESCRIPTION OF THE SEVERAL VIEWS OF THE DRAWINGS

In the following section, the invention will be described with reference to exemplary embodiments illustrated in the figures, in which.

DETAILED DESCRIPTION

Figure 1A:
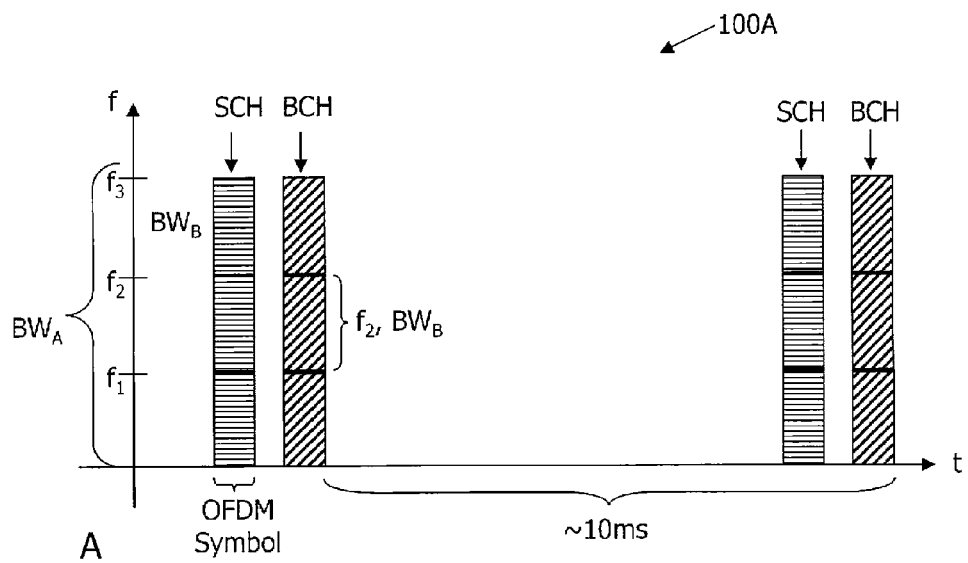
FIGS. 1(A)-1(B) are time domain charts illustrating how the SCH and/or BCH is transmitted in the cellular OFDM system.
Figure 1B:
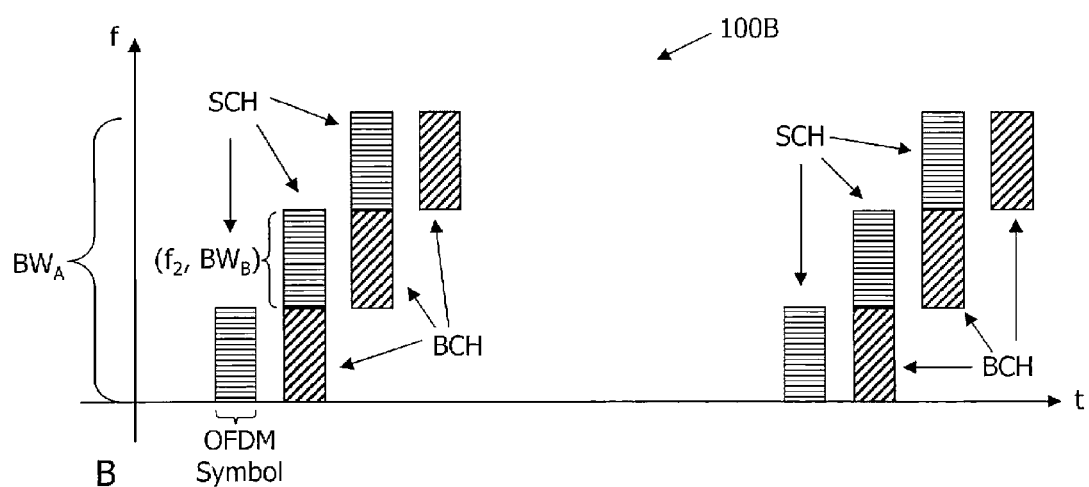

Referring now to the Figures, FIGS. 1(A) and 1(B) illustrate how the SCH and BCH signals are transmitted in a cellular OFDM system. The system BW, as seen in charts 100A and 100B, is $BW_A$ and the SCH and/or BCH BW is $BW_B$. As seen therein, the SCH and/or BCH is repeated in the frequency domain. In FIGS. 1A and 1B, $BW_A=3*BW_B$ hence the SCH and/or BCH is repeated three times, with each signal on a center frequency, in this case $$f_i = (i-1) \cdot \frac{BW_A}{3} + \frac{BW_A}{6}, i = 1, 2, 3.$$

Hereinafter each such SCH and/or BCH signal is labeled: ($f_i$; $BW_B$). The SCH and/or BCH could be repeated in the same OFDM symbol, as seen in FIG. 1(A) or in a staggered version, as seen in FIG. 1(B). The SCH and/or BCH is further repeated in the time domain with a regular pattern, typically 10 ms, and the BCH is placed in a well defined time instant after the SCH (the 2 OFDM signals as seen in FIGS. 1(A) and 1(B)). The structure of the SCH signal could, for example, be generated according to the process described in Minn.

Figure 2:
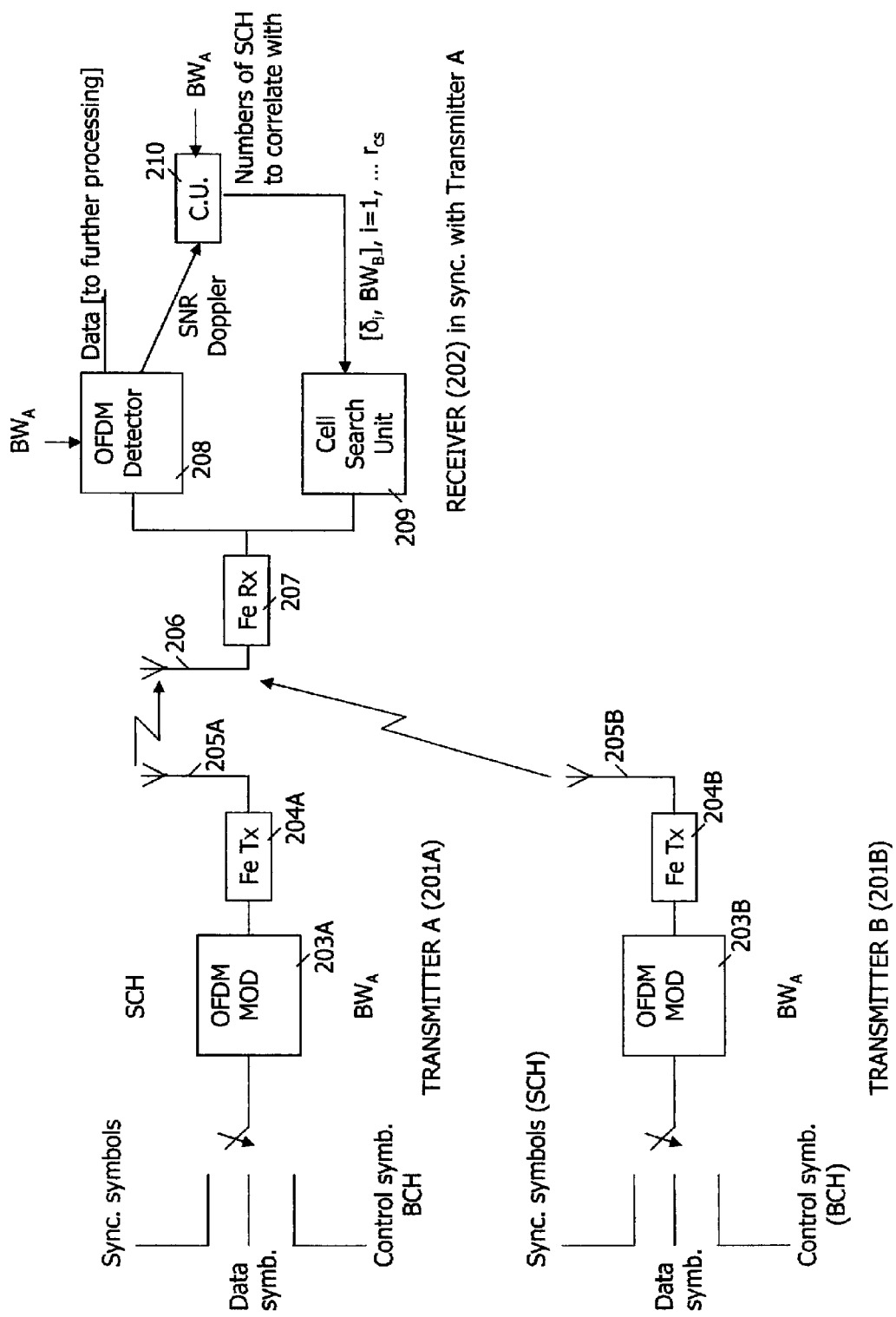
FIG. 2 illustrates a system including two transmitters and one receiver operating according to the present invention.
Figure 3A:
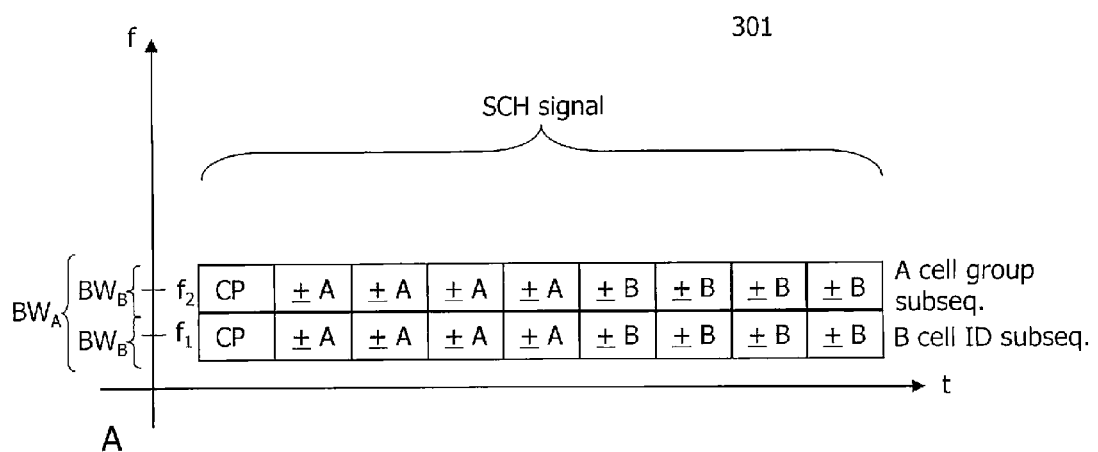
FIGS. 3(A)-3(B) are time domain charts illustrating SCH signals according to the present invention.

FIG. 2 illustrates a system including two transmitters 201A, 201B and one receiver 202 which operates according to the present invention. Receiver 202 preferably comprises a receiver section of a mobile terminal/UE. As seen therein, receiver 202 is in sync with transmitter A 201A and performs data detection of data transmitted from a first transmitter, transmitter A 201A. Simultaneously receiver 202 performs a cell search by searching for new cells, in this case, at least a second transmitter, transmitter B 201B, by correlating the delayed versions of the received signal in order to find the SCH signal from transmitter B 201B. In transmitters A and B, 201A, 201B, the SCH and/or BCH signal is time/frequency multiplexed in the OFDM modulators 203A, 203B respectively, which modulator is adapted to perform the conventional steps necessary to generate an OFDM modulated signal. The number of SCH and/or BCH signals repeated in the frequency domain is dependent on the system BW $BW_A$. The OFDM modulated baseband signal is then transformed to a radio signal in the front end transmitters (Fe TX) 204A, 204B, respectively, and transmitted by the transmitter antennas 205A, 205B. The receiver 202 receives the signal of BW $BW_A$ at antenna 206 (which can comprise a plurality of antennas), including signals from both transmitters A and B 201A, 201B and down-converts the signal to a baseband signal with BW $BW_A$ in the front-end receiver (Fe RX) 207. The signal is then fed to the OFDM detector 208 that detects and decodes the signal from transmitter A 201A. At the same time the received signal is fed to the cell search unit 209 that processes the received signal over at least one SCH signal BW with center frequency/BW ($f_i$; $BW_B$). The number of SCH BWs over which to perform cell searches is determined by control unit 210 (CU). The determination is based, among other things, on the mobile terminal/UE BW capabilities, on information about the signal to noise ratio (SNR) and Doppler measurements obtained using Pilot symbols transmitted from transmitter A 201A, the system BW $BW_A$, and information about BWs on neighboring cells received from transmitter A 201A. By way of example, and not limitation, if the SNR is low or Doppler is high, it is likely that the mobile terminal/UE will soon leave the coverage area of the cell to which it is then currently connected, hence it is very important to quickly find a new cell. In this case, CU 210 determines to correlate the received signal over multiple $BW_B$ (for example, over all 3 SCH signals 101, if referring to FIGS. 1A-1B). On the other hand, if the Doppler is low and SNR is high it is unlikely that a handover to a new cell is necessary and therefore the cell search could proceed in a conventional "slow search" mode where the mobile terminal/UE only correlates the received signal over one SCH signal BW ($f_1$; $BW_B$). If the SCH ($f_j$; $BW_B$) correlation value exceeds a certain threshold, the timing for the new transmitter B 204B is found. Then the cell ID must be detected. Detection of the cell ID can be done in two different ways according to the present invention. In the first method, as seen in FIG. 3(A), the SCH signal could further be split up in sub-sequences A, B, where the sub-sequence A is related to the cell group and sub-sequence B gives the cell ID. When the timing is found, the mobile terminal/UE correlates the received signal with the specific A sub-sequences to find the cell group. Then the UE correlates the received signal with the specific B sub-sequences to find the cell ID. Thereafter, the BCH on the corresponding center frequency ($f_j$; $BW_B$) is detected. In operation, the OFDM cellular telecommunications system of the present invention comprises a mobile terminal/user equipment (UE) having at least a first transmitter, the system operable across a BW, $BW_A$, the system having a synchronization channel (SCH) and a broadcast channel (BCH), each of SCH and BCH operable across certain BWs, (such SCH and BCH BWs collectively and individually referred to as a $BW_B$) wherein the SCH and/or BCH signals are localized within the $BW_A$ wide system BW and the SCH and BCH are repeated at least twice within the $BW_A$ wide system BW. The foregoing apparatus is adapted to enable an SCH and/or BCH, using a BW equal to the minimum possible BW for the system, by repeating the SCH and/or BCH signals for at least some parts of the entire system BW in the frequency domain.

Figure 3B:
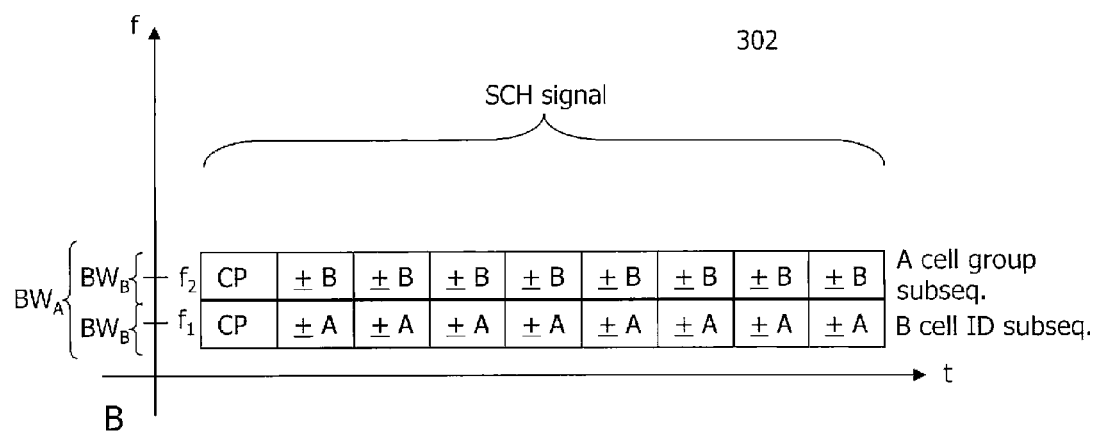

In the second method, the SCH signals on different center frequencies need not be identical. Instead, some of the SCHs could represent the cell group (only subsequences A) and some cell IDs (only subsequences B), as seen in FIG. 3(B). In this method, all SCH signals could be used to find the timing, regardless of which subsequence A or B is used. Hence, some of the SCH signals give the cell group and other SCH signals give the cell ID. The mobile terminal/UE correlates the received signal with the specific A subsequences to find the cell group. Then the mobile terminal/UE correlates the received signal with the specific B subsequences to find the cell ID. Thereafter, the BCH on the corresponding center frequency ($f_j$; $BW_B$) is detected.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. An apparatus for enabling a synchronization channel (SCH) and broadcast channel (BCH) using a bandwidth (BW) equal to the minimum possible BW for the system, comprising:
    a mobile terminal/user equipment (UE) operable in a cellular telecommunications system, said mobile terminal/UE having a receiver section;
    the receiver section operable to synchronize with and perform data detection of data from a first transmitter of the cellular telecommunications system;
    the receiver section operable to simultaneously perform a cell search by searching for at least a second transmitter in the cellular telecommunications system by correlating the delayed versions of received signals in order to find a SCH signal from the at least second transmitter; and
    wherein the first and at least a second transmitters are operable to time and frequency multiplex SCH and BCH signals using modulators adapted to output orthogonal frequency division modulated (OFDM) symbols, and to repeat SCH and/or BCH signals in the frequency domain.

2. The apparatus of claim 1, in combination with a first transmitter and at least a second transmitter, each such transmitter having a respective OFDM modulator operable to time and frequency multiplex SCH and/or BCH signals using their respective OFDM modulator.

3. The apparatus of claim 2, wherein the number of SCH and/or BCH signals repeated by each of the first transmitter and at least a second transmitter is dependent on the system BW $BW_A$.

4. The apparatus of claim 2, the first transmitter and at least a second transmitter each having a front end transmitter and transmitter antenna, the first transmitter and at least a second transmitter being operable to transform the OFDM modulated baseband signal to a radio signal in their respective front end transmitter (Fe TX) and transmit the radio signals by the transmitter antennas.

5. The apparatus of claim 4, further comprising:
    the front end receiver having at least one receiver antenna, the at least one receiver antenna coupled to an input of the front-end receiver, an OFDM detector coupled to a first output of the front-end receiver, a cell search unit coupled to a second output of the front-end receiver and a control unit (CU) coupled to the cell search unit;
    the front end receiver being adapted to receive from the first transmitter and at least a second transmitter a signal having $BW_A$ at the at least one receiver antenna;
    a receiver section of the front end receiver operable to down-convert the signal to a baseband signal with $BW_A$;
    the front-end receiver operable to feed the signal to the OFDM detector;
    the OFDM detector adapted to detect and decode the signal originating from the first transmitter;
    the front-end receiver adapted to simultaneously feed the received signal to the cell search unit;
    the cell search unit adapted to process the received signal over at least one SCH signal BW with center frequency/BW; and
    the CU adapted to determine the number of SCH BWs over which to perform the cell searches.

6. The apparatus of claim 5, wherein the CU is operable to determine the number of SCH BWs over which to perform cell searches based on at least one of the following: mobile terminal/UE BW capabilities; information about the signal to noise ratio (SNR) and Doppler measurements obtained using Pilot symbols transmitted from the first transmitter; system BW $BW_A$, and information about BWs on neighboring cells received from the first transmitter.

7. The apparatus of claim 6, wherein, if the SNR is low or Doppler measurement is high, the CU is adapted to correlate the received signal over the entire $BW_A$.

8. The apparatus of claim 6, wherein if the Doppler measurement is low and SNR is high, the CU causes the cell search to proceed in a "slow search" mode where the mobile terminal/UE only correlates the received signal over one SCH signal BW.

9. The apparatus of claim 6, wherein if the SCH correlation value exceeds a certain threshold, the timing for the at least second transmitter is found and the cell ID is detected.

10. The apparatus of claim 9, wherein detection of the cell ID is performed by the mobile terminal/UE by splitting the SCH signal into subsequences A, B, where the sub-sequence A is related to the cell group and sub-sequence B gives the cell ID;
    wherein when the timing is found, the mobile terminal/UE correlates the received signal with the specific A subsequences to find the cell group;
    wherein the mobile terminal/UE then is operable to correlate the received signal with the specific B subsequences to find the cell ID; and
    wherein thereafter, the BCH on the corresponding center frequency is detected.

11. The apparatus of claim 9, wherein the mobile terminal/UE is adapted to detect the cell ID when the SCH signals on different center frequencies are not be identical.

12. The apparatus of claim 11, further comprising the mobile terminal/UE operable to correlate the received signal with the specific A subsequences to find the cell group; and
    the mobile terminal/UE further operable to correlate the received signal with the specific B subsequences to find the cell ID and thereafter, detect the BCH on the corresponding center frequency.

13. A method for enabling in a receiver of a user equipment (UE) a synchronization channel (SCH) and broadcast channel (BCH) using a bandwidth (BW) equal to the minimum possible BW for a system, the method comprising:
    synchronizing with a performing data detection of data from a first transmitter of a cellular communications system;
    simultaneously performing a cell search by searching for at least a second transmitter in the cellular telecommunications system by correlating delayed versions of received signals in order to find a SCH signal from the at least a second transmitter; and
    wherein the SCH and/or BCH signals are repeated in the frequency domain for at least some parts of the entire system BW in the frequency domain by the first transmitter and at least a second transmitter.

14. The method of claim 13, further comprising performing the repetition step in the same OFDM symbol.

15. The method of claim 13, further comprising performing the repetition step in a staggered fashion.

16. The method of claim 13, wherein the SCH signals have a BW of 1.25 MHz.

17. The method of claim 16, wherein the SCH signals, including both cell group and cell ID information, are identical.

18. The method of claim 16, wherein some of the SCH signals represent cell groups and others represent cell IDs.

19. The method of claim 13 as implemented in a mobile terminal/user equipment (UE).

20. The method of claim 19, wherein the mobile terminal/UE is operable to search for a specific SCH signal and then read the BCH signal containing necessary information so as to camp/connect to the cell, regardless of the system BW.

21. The method of claim 20, wherein the SCH and/or BCH signal has a BW of 1.25 MHz.

22. The method of claim 13, as implemented by a mobile terminal/user equipment (UE) in a high BW system.

23. The method of claim 22, wherein the mobile terminal/UE is operable to determine whether to perform a cell search on a low or high BW to get sufficient cell detection performance.

24. The method of claim 23, wherein multiple SCH correlations are used if a high speed, fast cell detection is required.

25. The method of claim 13, wherein the SCH and/or BCH signal is repeated in the frequency domain a plurality of times.

26. The method of claim 25, wherein the SCH and/or BCH signal is repeated three times, with each signal on a center frequency.

* * * * *